United States Patent [19]

Kurachi

[11] 4,223,919
[45] Sep. 23, 1980

[54] DEVICE FOR COUPLING HOSE, PIPE OR THE LIKE

[76] Inventor: Hisaharu Kurachi, 11, Kawasakicho-2-chome, Chikusa-ku, Nagoya-shi, Aichi-ken, Japan

[21] Appl. No.: 32,845

[22] Filed: Apr. 24, 1979

[30] Foreign Application Priority Data

Jan. 19, 1978 [JP] Japan .................................. 53-3685

[51] Int. Cl.² ............................................ F16L 33/22
[52] U.S. Cl. ....................................... 285/8; 285/248; 285/272; 285/331
[58] Field of Search .................... 285/8, 248, 249, 386, 285/105, 104, 272, 331

[56] References Cited

U.S. PATENT DOCUMENTS

| | | | |
|---|---|---|---|
| 939,908 | 11/1909 | Greenlaw | 285/386 X |
| 2,031,337 | 2/1936 | Spalding | 285/272 X |
| 2,221,064 | 11/1940 | Tobler | 285/249 |
| 2,283,975 | 5/1942 | Dillon | 285/104 |
| 3,271,053 | 9/1966 | Kurachi | 285/8 |
| 3,653,688 | 4/1972 | Sakakibara | 285/105 |

FOREIGN PATENT DOCUMENTS 1095068 12/1960 Fed. Rep. of Germany ........... 285/249

Primary Examiner—Thomas F. Callaghan
Attorney, Agent, or Firm—Beveridge, DeGrandi, Kline & Lunsford

[57] ABSTRACT

A device for joining detachably a tubular member such as a hose, a pipe or the like to a main body which has at its end a cylindrical pipe and a flange which is formed along the outer periphery of said cylindrical pipe and whose peripheral surface is formed with screw threads. One end of an inner cylindrical pipe is connected to the flange of said main body in such a way that the inner cylindrical pipe may freely rotate about said cylindrical pipe. The inner cylindrical pipe is formed with a plurality of through holes which are circumferentially spaced apart. And an annular space is radially defined between the inner cylindrical pipe and the cylindrical pipe of said main body. Rolling elements are rotatably fitted into respective through holes of said inner cylindrical pipe. After said tubular member has been fitted into said annular space, an outer pipe is threadably engaged with the flange of said main body so that the tapered surface formed on the inner surface of the outer pipe may force the rolling elements radially inwardly, thereby clamping said tubular member between the cylindrical pipe of said main body and said rolling elements so as to join said tubular member to said main body.

5 Claims, 8 Drawing Figures

DEVICE FOR COUPLING HOSE, PIPE OR THE LIKE

BACKGROUND OF THE INVENTION

1. FIELD OF THE INVENTION

The present invention relates to a device for coupling or joining a tubular member such as a hose, pipe or the like to a main body such as a valve, a cock, a joint or the like.

2. BRIEF DESCRIPTION OF THE PRIOR ART

There have been known various types of structures of the devices for joining or coupling a tubular member such as a hose, a pipe or the like to a main body (to be referred simply as main body in the specification to be described below) which includes every member or body, such as a valve, a cock, a joint or the like, to which is connected said tubular member. In many of the said coupling devices, a tubular member is fitted over one end of a main body so as to cover it and is radially inwardly pressed from the exterior so as to join the tubular member to said main body by plastic deformation. However, when such a method as described above is employed, it is impossible to uniformly press each part of the tubular member and securely join it on to the main body. As a result, the tubular member is frequently detached from the main body. Furthermore, when the coupling device is frequently used for connection and disconnection, its performance becomes out of order so that a liquid leaks or the tubular member is damaged. Especially with the prior art coupling devices and in general with a tubular member such as rubber hose for waterworks which is relatively soft and tends to cause plastic deformations, it is relatively easy to securely and uniformly clamp and join, but in the case of the hard materials such as high pressure hoses lined with strong fabrics, polyethylene pipes, plastic tubes and so on which are used for the transportation of acetylene, oxygen, hydrogen, compressed air and the like and which are not easily suceptible to plastic deformations, it is extremely difficult to securely press and join with uniform clamping forces and the release of the tubular member from the main body may not be effected easily.

SUMMARY OF THE INVENTION

The present invention was made to overcome the above and other problems encountered in the prior art coupling devices. Therefore one of the objects of the present invention is to provide a coupling device which may uniformly and forcibly clamp and press not only a general type hose for waterworks which is readily susceptible to plastic deformations but also a hard tubular member such as high pressure hose which is hardly susceptible to plastic deformations to a main body, thereby joining said tubular member to said main body.

Another object of the present invention is to provide a coupling device which may securely and quickly join to a main body or disconnect therefrom a tubular member in a simple manner.

A further object of the present invention is to provide a coupling device for joining or coupling a tubular member to a main body whose performance will not become out of order or which will not be damaged even when it is very frequently used.

According to the present invention, there is provided a device for joining a tubular member such as a hose, a pipe or the like to a main body which has at its one end a cylindrical pipe and a flange which is formed around said cylindrical pipe and whose peripheral surface is externally screw-threaded, said device has an inside cylindrical pipe which is formed with a plurality of through holes which are circumferentially spaced apart from each other and whose one end is connected to said flange of said main body in such a way that said inside cylindrical pipe may be freely rotated about said cylindrical pipe, an annular space being radially defined between said cylindrical pipe and said inside cylindrical pipe; rolling elements rotatably fitted into the through holes formed in said inside cylindrical pipe; and outer pipe in which screw threads are formed on one side of the inner surface when viewed in the axial direction and a tapered surface which is inclined in the axial direction is formed on the other side and which is adapted to be connected to said main body when said screw threads are engaged with the screw threads formed in said flange in such a way that said outer pipe may externally surround said inside cylindrical pipe and said rolling elements, whereby said outer pipe is threadably engaged with said main body with said tubular member being fitted into said annular space, and the tapered surface formed on the inside surface of said outer pipe forces said rolling elements radially inwardly, thereby clamping said tubular member between said cylindrical pipe of said main body and said rolling elements so as to join said tubular member to said main body.

DESCRIPTION OF THE PREFERRED EMBODIMENTS

A coupling device for joining hoses, pipes or the like to a main body in accordance with the present invention will be described with reference to preferred embodiments shown in the accompanying drawings.

Figure 1:
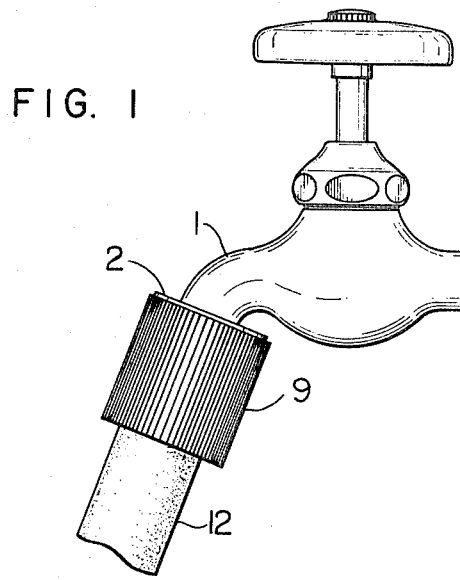
FIG. 1 is a side view of a coupling device in accordance with the present invention when used for joining a rubber hose to a faucet for waterworks which is a main body.
Figure 2:
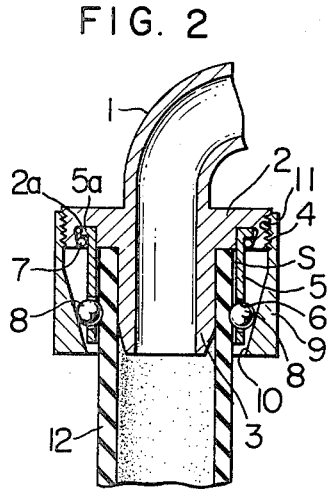
FIG. 2 is a longitudinal sectional view of a first embodiment of a coupling device in accordance with the present invention.

Referring first to FIGS. 1 and 2, the present invention will be described in connection with the coupling of a rubber hose 12 to a faucet 1 for waterworks, but it is to be understood that the faucet 1 is an example of "a main body" which includes every member or body to which is detachably or permanently coupled a tubular member such as a hose, a pipe or the like. Thus the main body includes, a valve, a cock, a joint, a fitting, a pipe or hose or the like.

Figure 3:
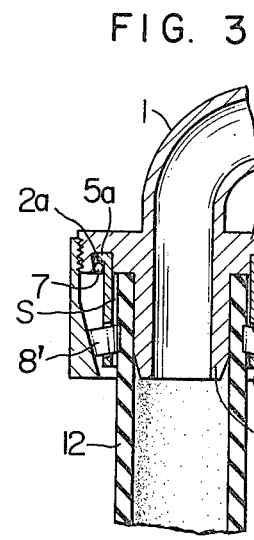
FIG. 3 is a longitudinal sectional view of a second embodiment of a coupling device in accordance with the present invention.
Figure 5:
FIG. 5 is a perspective view of a rolling element used in the first embodiment shown in FIG. 2.
Figure 4:
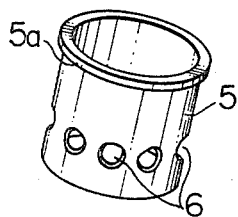
FIG. 4 is a perspective view of an inside cylindrical pipe of the first embodiment shown in FIG. 2.
Figure 6:
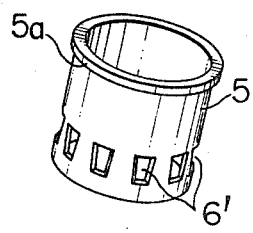
FIG. 6 is a perspective view of an inside cylindrical pipe of the second embodiment shown in FIG. 3.
Figure 7:
FIG. 7 is a rolling element used in the second embodiment shown in FIG. 3.
Figure 8:
FIG. 8 is a perspective view of a still another form of a rolling element which is a barrel roller.

The main body 1 has a flange 2 formed integral therewith at one end thereof and a cylindrical pipe or a tubular member receiving projection 3 extended outwardly coaxially of the flange 2. The peripheral surface of the flange 2 is externally threaded as indicated by 4. The coupling device further includes a cylindrical inner pipe section 5 formed with a plurality of circumferentially equiangularly spaced holes 6 (See FIG. 4). The inner pipe section 5 is so mounted on or connected to the flange 2 of the main body 1 in such a way that the inner pipe section 5 may be rotatable coaxially of the cylindrical pipe 3. The diameter of the inner pipe section 5 is so determined that an annular space S may be defined radially between the cylindrical pipe 3 and the inner pipe section 5. In the embodiment shown in FIGS. 1 and 2, a flange 5a which is formed at the upper end of the inner pipe section 5 is slidably rotatably fitted into an annular mating groove 2a formed in the undersurface of the flange 2 of the main body 1 and is prevented from withdrawal therefrom by means of a retaining ring 7. It is to be understood that the rotatable connection of the inner pipe section 5 to the flange 2 of the main body 1 is not limited to that described above and that any suitable connecting methods and means may be used. For instance, the inner pipe section 5 may be rotatably connected to the flange 2 through steel balls or a bearing. In the first embodiment, as shown in FIGS. 2, 4 and 5, a spherical rolling element such as a steel ball 8 is rotatably fitted into each of circular holes 6 of the inner pipe section 5. Alternatively, in the second embodiment, as shown in FIGS. 3, 6 and 7, a frustoconical roller 8' is rotatably fitted into each of holes 6' which are trapezoidal in shape. Furthermore a barrel-roller 8" shown in FIG. 8 may be used. In any cases, or regardless of the shapes of the rolling elements 8, 8' and 8", they are fitted into the holes 6 or 6' of the inner pipe section 5 in such a way that they may project from the inside and outside surfaces of the inner pipe section 5 and may be prevented from getting out of the holes 6 or 6' radially inwardly of the inner pipe section 5 as best shown in FIGS. 2 and 3.

When the frustoconical rollers 8' as shown in FIG. 3 are used, the axis of each roller 8' is inclined at an angle relative to the vertical when fitted into the hole 6'.

The coupling device further includes an outer pipe section or a gripping sleeve 9 with the upper end being internally screw-threaded as indicated by 11 for threadable engagement with the external screw threads 4 of the flange 2 of the main body 1. The inside surface of the outer pipe section 9 is tapered from the lower end toward the internally screw-threaded portion 11 in such a way that the inner diameter may be gradually increased as indicated by 10.

In order to couple the rubber hose 12 to the main body or the faucet 1, one end of the hose 12 is fitted into the space S between the cylindrical pipe 3 and the inner pipe section 5 after the inner pipe section 5 has been rotatably connected to the flange 2. Thereafter, the outer pipe section 9 is passed over the inner pipe section 5 and the internally screw-threaded portion 11 of the former is engaged with the external screw threads 4 of the flange 2 of the main body 1. As the outer pipe section 9 is turned tight, the rolling elements 8 or 8' are radially inwardly pressed against the hose 12 by the outer pipe section 9 formed with the inside tapered surface 10, thereby firmly gripping it as shown in FIGS. 2 and 3.

To release the hose 12 from the main body 1, the outer pipe section 9 is loosened so that the rolling elements 8 or 8' may be also released, whereby the hose 12 may be released. Thereafter one may easily pull the hose 12 out of the space S between the cylindrical pipe 3 and the inner pipe section 5.

Thus the tubular member 12 may be quickly and easily connected to or disconnected from the main body 1.

According to the present invention, as the outer pipe section 9 is tightened, the inside tapered surface 10 uniformly forces the rolling members 8 or 8' toward the hose 12 in the annular space S so that the hose 12 in turn is forced to be pressed against the cylindrical pipe 3. Therefore even a tubular member made of a hard material such as a high pressure hose may be securely, uniformly and easily connected to the main body 1.

The inner pipe section 5 is rotatably connected to the flange 2 of the main body 1 so that when the outer pipe section 9 is turned and tightened, the inner pipe section 5 rotates around the hose 12 and the rolling elements 8 or 8' retained in the holes 6 or 6' of the inner pipe section 5 may also turn around the hose 12 while rotating round on their own axes and gradually move radially inwardly until they are completely locked by the inside tapered surface 10 of the outer pipe section 9. Therefore the hose 12 in the annular space S may be completely prevented from being twisted or otherwise deformed or damaged and may be very tightly and securely clamped to the cylindrical pipe 3. Furthermore, even when the coupling device of the present invention is very frequently used, its satisfactory performance may be guaranteed.

What is claimed is:

1. A device for coupling a hose to a pipe comprising: an annular flange means securely provided around said pipe adjacent its outlet, an inside cylindrical member coaxially disposed around the outlet portion of said pipe so as to define an annular space for receiving the end portion of said hose between said outlet portion and said inside cylindrical member, means for freely rotatably connecting said inside cylindrical member at its one end to said flange means while constraining the axial movement of said inside cylindrical member with respect to said flange means, said inside cylindrical member having a plurality of circumferentially spaced holes therein, rolling elements rotatably fitted into said holes so as to project from the inner and outer walls of said inside cylindrical member, and an outside cylindrical member coaxially disposed around said inside cylindrical member in spaced relationship therefrom engaged by threads at one end with said flange means, the inner wall of said outside cylindrical member being converged towards the end thereof remote from said flange means and in rolling engagement with said rolling elements, whereby said hose maybe inserted into said annular space so that when said outside cylindrical member is turned in one direction, it is axially displaced towards said flange means thereby urging said rolling elements against said hose, to firmly clamp said hose around said outlet portion of said pipe.

2. A device as claimed in claim 1 wherein said means for rotatably connecting said inside cylindrical member to said flange means comprises an annular groove coaxially formed in said flange means opening towards said inside cylindrical member, an annular flange provided on said one end of the inside cylindrical member and rotatably fitted into said annular groove, and a retaining ring securely fitted into said annular groove for retaining said flange of the inside cylindrical member in position.

3. A device as claimed in claim 1 wherein each of said rolling elements has such a dimension as to be prevented from passing through its associated hole and is fitted into the associated hole from the outside of said inside cylindrical member.

4. A device as claimed in claim 1, 2 or 3 wherein said rolling elements are spherical and said holes are circular.

5. A device as claimed in claim 1, 2 or 3 wherein said holes a trapezoidal, and said rolling elements are frusto-conical and are fitted into said holes so as to be in linear contact with both the converged inner wall of said outside cylindrical member and the outer surface of said hose.

* * * * *